(12) United States Patent
Iizumi et al.

(10) Patent No.: US 11,592,624 B2
(45) Date of Patent: Feb. 28, 2023

(54) FIBER OPTIC MICRO CONNECTOR

(71) Applicant: Senko Advanced Components, Inc., Marlborough, MA (US)

(72) Inventors: Kenji Iizumi, Tokyo (JP); Kazuyoshi Takano, Tokyo (JP); Ryo Konno, Tokyo (JP)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

(21) Appl. No.: 17/196,683

(22) Filed: Mar. 9, 2021

(65) Prior Publication Data

US 2021/0286135 A1    Sep. 16, 2021

Related U.S. Application Data

(60) Provisional application No. 62/988,361, filed on Mar. 11, 2020.

(51) Int. Cl.
  *G02B 6/38*         (2006.01)

(52) U.S. Cl.
  CPC ......... *G02B 6/3826* (2013.01); *G02B 6/3821* (2013.01); *G02B 6/3825* (2013.01); *G02B 6/3869* (2013.01)

(58) Field of Classification Search
  CPC .. G02B 6/3826; G02B 6/3821; G02B 6/3825; G02B 6/3869; G02B 6/3893; G02B 6/389; G02B 6/3891
  See application file for complete search history.

(56) References Cited

U.S. PATENT DOCUMENTS

| | | | |
|---|---|---|---|
| 5,212,752 | A | 5/1993 | Stephenson et al. |
| 5,216,733 | A | 6/1993 | Nagase et al. |
| 5,598,495 | A | 1/1997 | Rittle et al. |
| 6,217,231 | B1 | 4/2001 | Mesaki et al. |

(Continued)

FOREIGN PATENT DOCUMENTS

| | | | |
|---|---|---|---|
| JP | 2001147347 A | * | 5/2001 |
| JP | 2001147347 A1 | † | 5/2001 |

(Continued)

OTHER PUBLICATIONS

International Search Report and Written Opinion, Application No. PCT/US20/058358, dated Mar. 4, 2021, 11 pages.

*Primary Examiner* — Ryan A Lepisto
*Assistant Examiner* — Erin D Chiem (57) ABSTRACT

A micro connector kit includes first and second ferrules and first and second micro connector ferrule housings. Each first and second micro connector ferrule housing defines a cavity sized and shaped to receive a respective one of the first and second ferrules with the first and second ferrules being disposed in closely spaced relation with the respective first or second micro connector ferrule housing when in each cavity. The first and second micro connector ferrule housings can be releasably coupled together such that the first and second ferrules form an optical connection when the first and second micro connector ferrule housings are coupled together. The first and second micro connector ferrule housings have first and second connection structure for releasably coupling the first and second micro connector housings together.

10 Claims, 8 Drawing Sheets

(56) References Cited

U.S. PATENT DOCUMENTS

| | | |
|---|---|---|
| 2006/0193562 A1 | 8/2006 | Theuerkorn |
| 2009/0220227 A1 | 9/2009 | Wong et al. |
| 2010/0310213 A1 | 12/2010 | Lewallen et al. |
| 2017/0242199 A1 | 8/2017 | Gniadek et al. |
| 2017/0269315 A1 | 9/2017 | Yeh et al. |
| 2017/0285274 A1* | 10/2017 | Matsumoto .......... G02B 6/3891 |
| 2020/0326495 A1 | 10/2020 | Liao et al. |

FOREIGN PATENT DOCUMENTS

| | | | |
|---|---|---|---|
| JP | 3369057 | 1/2003 | |
| JP | 2003-329880 | 11/2003 | |
| WO | 200227374 B2 † | 4/2002 | |
| WO | WO-0227374 A1 * | 4/2002 | ............. G02B 6/383 |

\* cited by examiner
† cited by third party

FIBER OPTIC MICRO CONNECTOR

CROSS-REFERENCE TO RELATED APPLICATION

This application claims priority to U.S. Provisional App. No. 62/988,361, filed Mar. 11, 2020, the entirety of which is hereby incorporated by reference.

FIELD

The present disclosure generally relates to fiber optic connections, and, more specifically, to a fiber optic micro connector.

BACKGROUND

Optical connectors are used within optical communication networks to interconnect optical cables to optical devices or other optical cables. Optical connections typically involve two optical connectors connected together.

SUMMARY

In one aspect, a micro connector kit comprises a first ferrule configured to be connected to a first optical fiber. A second ferrule is configured to be connected to a second optical fiber. First and second micro connector ferrule housings each define a cavity sized and shaped to receive a respective one of the first and second ferrules with the first and second ferrules being disposed in closely spaced relation with the respective first or second micro connector ferrule housing when in each cavity. The first and second micro connector ferrule housings are formed integrally with the first and second micro connector ferrule housings, respectively, and are configured to be releasably coupled together such that the first and second ferrules form an optical connection when the first and second micro connector ferrule housings are coupled together. The first and second micro connector ferrule housings have first and second connection structure configured to releasably couple the first and second micro connector housings together.

Other objects and features of the present disclosure will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
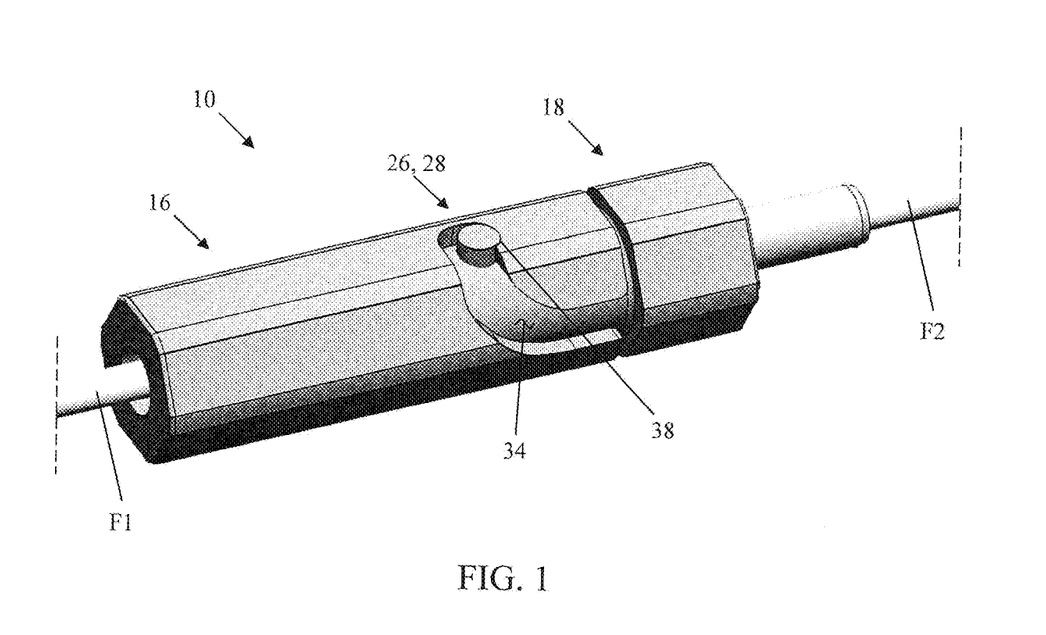
FIG. 1 is a perspective of a micro connector assembly according to one embodiment of the present disclosure.

Referring to FIGS. 1-5, a fiber optic connector assembly or micro connector assembly according to one embodiment of the present disclosure is generally indicated at reference numeral 10. The fiber optic connector assembly 10, or more particularly a collection of its component parts, may be referred to as a "kit." The fiber optic connector assembly 10 includes first and second ferrules 12, 14, and first and second micro connector ferrule housings 16, 18 (a "first housing" and a "second housing"). The first ferrule 12 is connected to a first optical fiber F1. The second ferrule 14 is connected to a second optical fiber F2. The first and second ferrules 12, 14 each define an internal passage (not shown) for receiving the first and second optical fibers F1, F2, respectively. In one embodiment, each ferrule 12, 14 receives a single optical fiber. The fiber optic connector assembly 10 is used to form a fiber optic connection. When the fiber optic connector assembly 10 is assembled together, as shown in FIG. 1, an optical connection (e.g., a fiber optic connection) is formed between the first and second ferrules 12, 14 (FIG. 3) that enables communication therebetween in an optical communications network (e.g., the first and second optical fibers F1, F2). Other configurations of the fiber optic connector assembly 10 are within the scope of the present disclosure. For example, the connector assembly could make electrical or other types of connections instead of or in addition to an optical connection. Preferably, the fiber optic connector housings 16, 18 are small and conform closely to the ferrules 12, 14 so as to take up minimal space. The first and second housings 16, 18 can be considered plug frames for their respective ferrules 12, 14.

Figure 2:
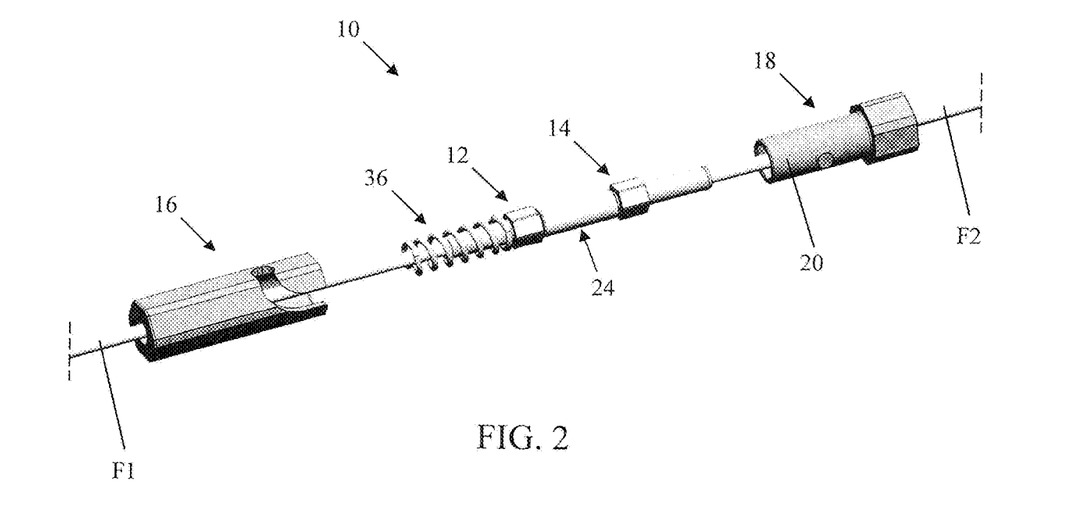
FIG. 2 is a partially exploded perspective of the micro connector assembly.

The first and second housings 16, 18 each define a cavity sized and shaped to receive at least one of the first and second ferrules 12, 14. The first and second ferrules 12, 14 are disposed in a closely spaced relation with the first and second housings 16, 18 when in each cavity. The first and second housings 16, 18 are generally cylindrical in shape. The polygonal shapes of the first housing 16 and a portion of the second housing 18 are considered generally cylindrical in this description. As shown, each cavity has a height and a width such that it can only receive only one ferrule 12, 14 in heightwise and widthwise directions (e.g., cannot receive two ferrules in a side-by-side arrangement but may still be long enough to receive two ferrules in an end-to-end arrangement). In the illustrated embodiment, the cavity of the first housing 16 is also sized in shaped to receive an insert portion 20 of the second housing 18. In this embodiment, the insert portion 20 defines a portion of the cavity of the second housing 18 and also receives at least a portion of the first ferrule 12 when the first and second housing are coupled together. The insert portion 20 can slide into and out of the first housing 16 (e.g., an open end thereof). Thus, the insert portion 20 (broadly, at least a portion of the second housing 18) is configured to be disposed within the first housing 16 when the first and second housings are coupled together. The first and second housings 16, 18 each have fiber optic openings (e.g., in an end thereof) sized and shaped to correspond to the shape of the first and second optical fibers F1, F2, respectively, to permit the first and second optical fibers to pass through the respective first and second housings and into each respective cavity.

In this embodiment, the second housing 18 is configured to engage the first and second ferrules 12, 14 to prevent the first and second ferrules from rotating relative to the second housing. The first and second ferrules 12, 14 each include a flange 22 having a polygonal (e.g., hexagonal) cross-section (e.g., cross-sectional shape). The portion of the cavity defined by the insert portion 20 has a polygonal (e.g., hexagonal) cross-section that matches the polygonal cross-sections of the flanges 22. Thus, rotation of the first and second ferrules 12, 14 is inhibited by the insert portion 20 when the flanges 22 of the first and second ferrules are disposed within the portion of the cavity of the second housing 18 defined by the insert portion. Other configurations of the first and second ferrules 12, 14 are within the scope of the present disclosure. One example of alternative configurations of the first and second ferrules are generally indicated by reference numerals 12' and 14', respectively in FIG. 4. The ferrules 12', 14' can be used with the fiber optic connector assembly 10 of FIG. 1. In this embodiment, the first and second ferrules 12', 14' also include polygonal flanges 22' but include mating end portions (e.g., tips) that are narrow than the mating end portions of the ferrules 12, 14 of FIG. 3. The overall shape of each flange 22' differs from that of the flange 22

Figure 3:
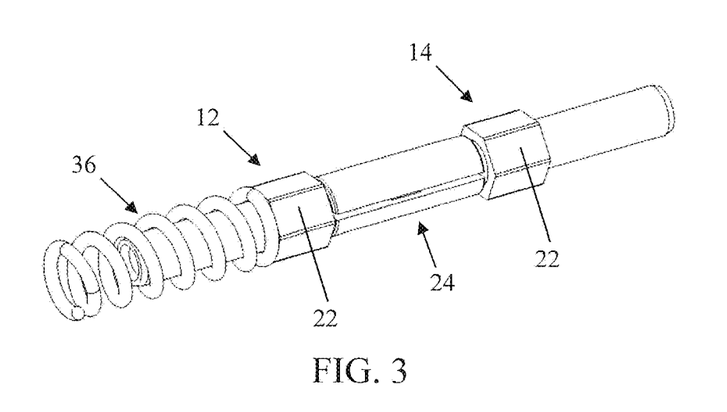
FIG. 3 is a perspective of first types of ferrules of the micro connector assembly forming an optical connection.
Figure 4:
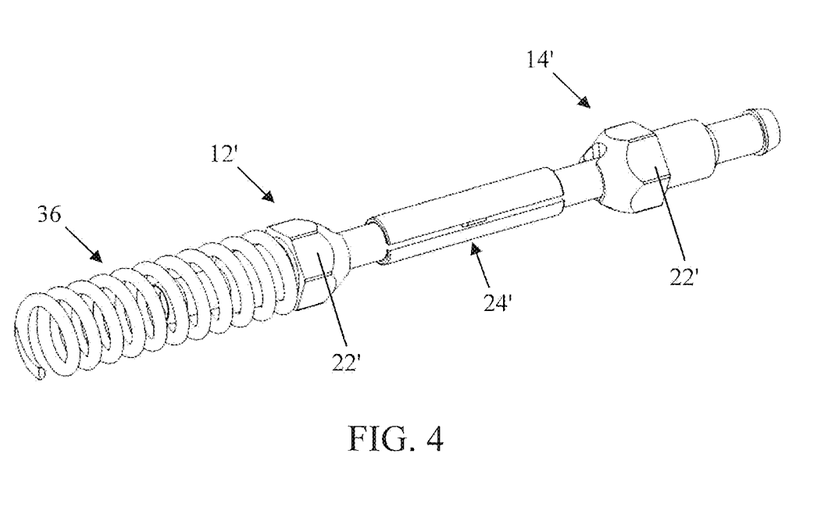
FIG. 4 is a perspective of second type of ferrules of another embodiment of the micro connector assembly forming an optical connection.

To assist the ferrules 12, 12', 14, 14' in making the optical connection when the first and second housings 16, 18 are coupled together, the fiber optic connector assembly 10 may include an alignment sleeve 24, 24'. The alignment sleeve 24, 24' is configured to receive the mating end portions of the first and second ferrules 12, 12', 14, 14'. The alignment sleeve 24, 24' aligns the first and second ferrules 12, 12', 14, 14' with each other for the best optical transmission.

The first and second housings 16, 18 are configured to be releasably coupled (e.g., directly or indirectly coupled) together such that the first and second ferrules 12, 12', 14, 14' form an optical connection when the first and second housings are coupled together. The first and second housings 16, 18 each have connection structure 26, 28 (e.g., first connection structure, second connection structure) configured to releasably couple the first and second housings together. The connection structure 26, 28 is formed integrally with a respective one of the first and second housings 16, 18. In the illustrated embodiment, the first and second housings 16, 18 are configured to be directly coupled together. The first and second connection structures 26, 28 are interengageable (e.g., directly engage each other) to releasably couple the first and second housings 16, 18 together. The first connection structure 26 is part of the first housing 16 and the second connection structure 28 is part of the second housing 18.

Figure 5:
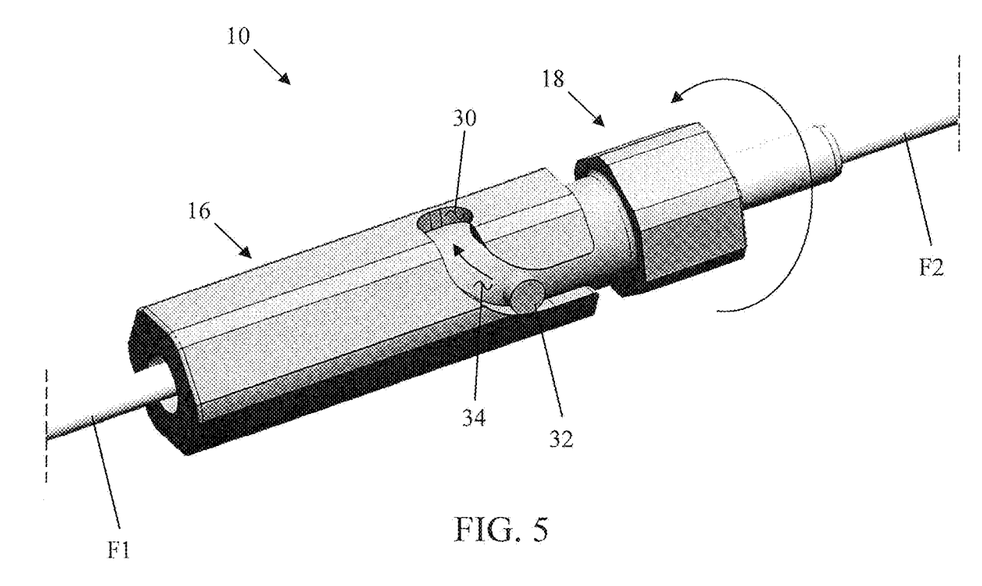
FIG. 5 is a perspective of two housings of the micro connector assembly of FIG. 1 being attached together.

In the illustrated embodiment, the first connection structure 26 comprises a recess 30 formed into the first housing 16. The second connection structure 28 comprises a protrusion 32 formed as one piece of material with the second housing 18. The protrusion 32 is sized and shaped to be received in the recess. The recess 30 is defined by the first housing 16. Positioning the protrusion 32 in the recess 30 couples the first and second housings 16, 18 together. The first housing 16 defines a channel 34 extending from the recess 30. The channel 34 is sized and shaped to permit the protrusion 32 to move within the channel (e.g., toward or away from the recess 30). In the illustrated embodiment, the channel 34 is arcuate such that the second housing 18 rotates relative to the first housing 16 as the protrusion 32 is moved within the channel 34. In other words, the first and second housings 16, 18 are rotated relative to each other to couple and decouple from each other. The channel 34 has an open end opposite the recess 30. The open end of the channel 34 is sized and shaped to permit the protrusion 32 to enter the channel and move toward the recess 30 to couple the first and second housings 16, 18 together. The open end of the channel 34 is sized and shaped to permit the protrusion 32 to exit the channel and move away from the recess 30 to disconnect the first and second housing 16, 18 from each other.

In the illustrated embodiment, the first and second housings 16, 18 are each an integral, one-piece component. For example, the first and second housings 16, 18 may each be a single piece of molded plastic. In other embodiments, the first and second housings 16, 18 may be formed from two or more pieces coupled or secured together.

The fiber optic connector assembly 10 may include one or more biasing springs 36 (e.g., coil springs). The one or more biasing springs 36 are configured to bias at least one of the first or second ferrules 12, 12', 14, 14' toward the other respective ferrule when the first and second housings 16, 18 are coupled together. In the illustrated embodiment, the fiber optic connector assembly 10 includes one biasing spring 36. The spring 36 helps maintain the optical connection between the first and second ferrules 12, 12', 14, 14'. One end of the spring 36 engages the end of the first housing 16 and the other end of the spring engages the flange 22, 22' of the first ferrule 12, 12' and biases the first ferrule out of the first housing toward the second ferrule 14, 14'. The spring 36 is received in the cavity of the first housing 16.

In this embodiment, the spring 36 is also configured to bias the first and second housings 16, 18 to remain in a locked position (FIG. 1). The first and second housings 16, 18 are releasably coupled together when the first and second housings are in the locked position. In the locked position, the protrusion 32 is disposed in the recess 30. The first housing 16 includes a lip 38 bordering the recess 30, which inhibits the protrusion from moving into the channel 34 unless the biasing force of the spring 36 is overcome (e.g., manually overcome). Accordingly, the spring 36 biases the first and second housings 16, 18 away from each other. To disconnect the first and second housings 16, 18, the first and second housings are first pushed together (moving the protrusion 32 clear of the lip 38) and then rotated relative to one another to move the protrusion along and out of the channel 34 (through the open end). To couple the first and second housings 16, 18 together, the protrusion 32 is moved into the channel 34 through the open end and then the first and second housings are rotated relative to one another to move the protrusion along the channel and into the recess 30. Accordingly, the first and second housings 16, 18 (broadly, at least one of the first and second housings) are configured to rotated relative to each other to connect the first and second housings to each other and to be rotated relative to each other in an opposite direction(s) to disconnect the first and second housings from each other.

In one embodiment, to form the connection, the first optical fiber F1 is threaded through the opening of the first housing 16, the spring 36 is threaded onto the first optical fiber and then the first optical fiber is terminated in the first ferrule 12, 12'. Similarly, the second optical fiber F2 is threaded through the opening of the second housing 18 and then connected to the second ferrule 14, 14'. The first and second ferrules 12, 12', 14, 14' are then inserted into the alignment sleeve 24, 24'. After, the first and second housing 16, 18 are moved over the first and second ferrules 12, 12', 14, 14' and coupled together as described above, securing the optical connection.

Figure 6:
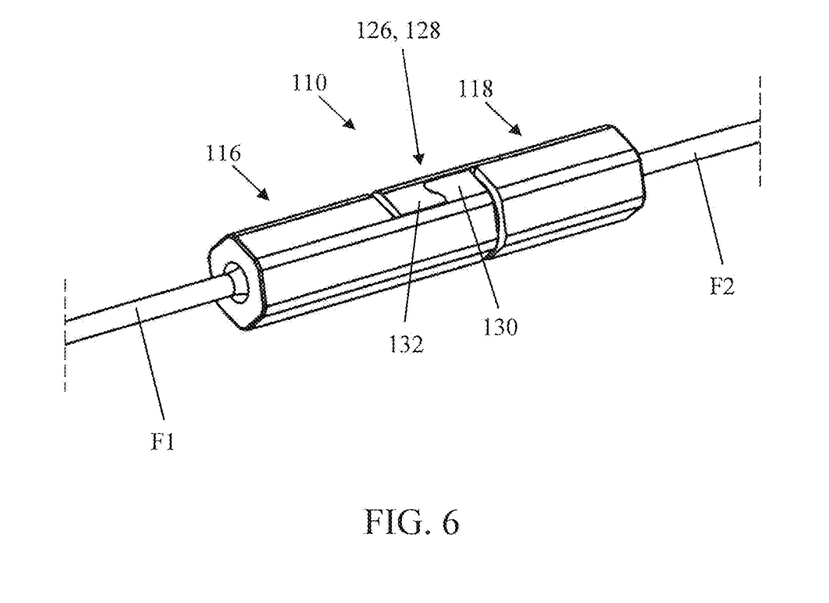
FIG. 6 is a perspective of a micro connector assembly according to another embodiment of the present disclosure.

Referring to FIGS. 6-9, a fiber optic connector assembly or micro connector assembly according to another embodiment of the present disclosure is generally indicated at reference numeral 110. The fiber optic connector assembly 110, or more particularly a collection of its component parts, may be referred to as a "kit." The fiber optic connector assembly 110 includes first and second ferrules 112, 114, and first and second micro connector ferrule housings 116, 118 (a "first housing" and a "second housing"). The first ferrule 112 is configured to be connected to a first optical fiber F1. The second ferrule 114 is configured to be connected to a second optical fiber F2. The first and second ferrules 112, 114 each define an internal passage (not shown) for receiving the first and second optical fibers F1, F2, respectively. The fiber optic connector assembly 110 is used to form a fiber optic connection. When the fiber optic connector assembly 110 is assembled together, as shown in FIG. 6, an optical connection (e.g., a fiber optic connection) is formed between the first and second ferrules 112, 114 that enables communication therebetween in an optical communications network (e.g., the first and second optical fibers F1, F2). Other configurations of the fiber optic connector assembly 110 are within the scope of the present disclosure. For example, the connector assembly could make electrical or other types of connections instead of or in addition to an optical connection.

Figure 7:
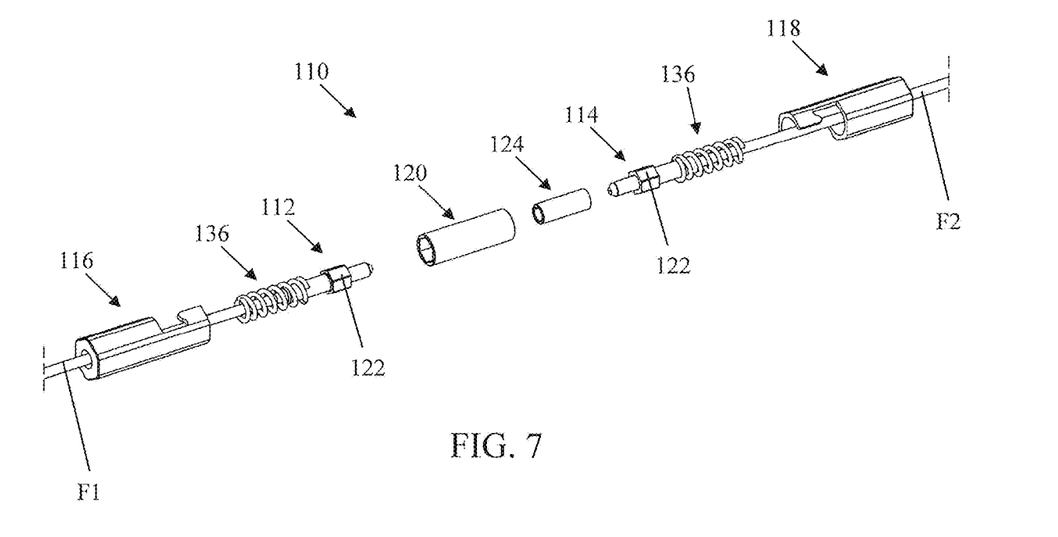
FIG. 7 is an exploded perspective of the micro connector assembly of FIG. 6.

The first and second housings 116, 118 each define a cavity sized and shaped to receive at least one of the first and second ferrules 112, 114. The first and second ferrules 112, 114 are disposed in a closely spaced relation with the first and second housings 116, 118 when in each cavity. Preferably, each cavity has a height and a width such that it can only receive only one ferrule 112, 114 in heightwise and widthwise directions (e.g., can't receive two ferrules in a side-by-side arrangement but may still be long enough to receive two ferrules in an end-to-end arrangement). The first and second housings 116, 118 are generally cylindrical in shape. The first and second housings 116, 118 each have fiber optic openings sized and shaped to correspond to the shape of the first and second optical fibers F1, F2, respectively, to permit the first and second optical fibers to pass through the respective first and second housings and into each respective cavity.

Figure 8:
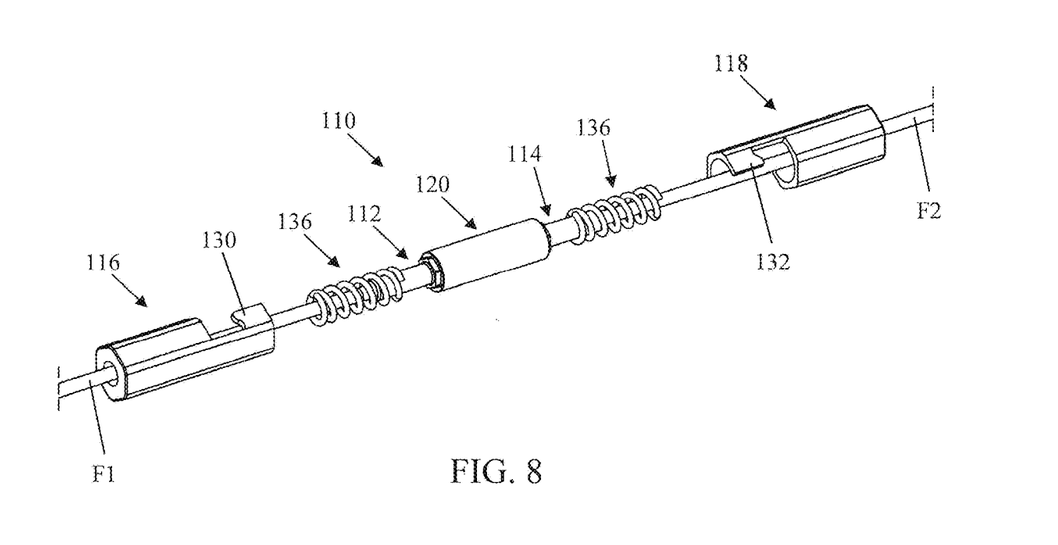
FIG. 8 is a partially exploded perspective of the micro connector assembly of FIG. 6.
Figure 9:
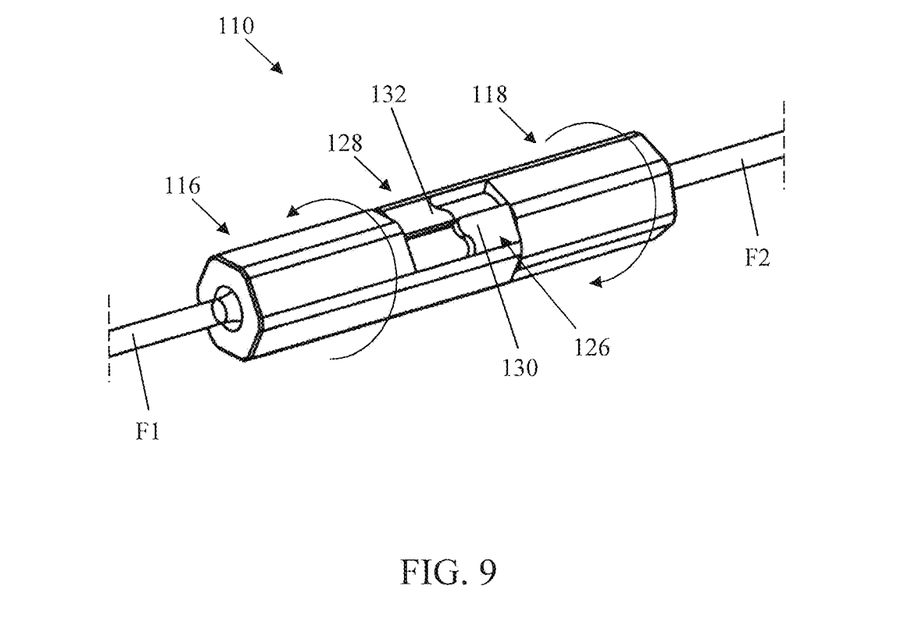
FIG. 9 is a perspective of two housing of the micro connector assembly of FIG. 6 being detached from each other.

In this embodiment, the fiber optic connector assembly 110 includes an insert 120. The insert 120 is configured to be disposed in each cavity of the first and second housing 116, 118 when the first and second housing are coupled together. In other words, the cavity of the first housing 116 is sized in shaped to receive a portion of the insert 120 and the cavity of the second housing 118 is sized and shaped to receive another portion of the insert. The insert 120 can slide into and out of the first and second housings 116, 118 (e.g., open ends thereof). Thus, the insert 120 is configured to be disposed within the first and second housings 116, 118 when the first and second housings are coupled together.

In this embodiment, the insert 120 is configured to engage the first and second ferrules 112, 114 to prevent the first and second ferrules from rotating relative to each other. The insert 120 defines a ferrule cavity of sized and shaped to receive portions of the first and second ferrules 112, 114. The first and second ferrules 112, 114 each include a flange 122 having a polygonal (e.g., hexagonal) cross-section (e.g., cross-sectional shape). The ferrule cavity defined by the insert 120 has a polygonal (e.g., hexagonal) cross-section that matches the polygonal cross-sections of the flanges 122. Thus, rotation of the first and second ferrules 112, 114 relative to each other is inhibited by the insert 120 when the flanges 122 of the first and second ferrules are disposed within the ferrule cavity of the insert.

To assist the ferrules 112, 114 in making the optical connection when the first and second housings 116, 118 are coupled together, the fiber optic connector assembly 110 may include an alignment sleeve 124. The alignment sleeve 124 is configured to receive the mating end portions (e.g., tips) of the first and second ferrules 112, 114. The alignment sleeve 124 aligns the first and second ferrules 112, 114 with each other. The alignment sleeve 124 is sized and shaped to be received in the ferrule cavity of the insert 120. In other words, the alignment sleeve 124 is disposed in the insert 120.

The first and second housings 116, 118 are configured to be releasably coupled (e.g., directly or indirectly coupled) together such that the first and second ferrules 112, 114, form an optical connection when the first and second housings are coupled together. The first and second housings 116, 118 each have connection structure 126, 128 (e.g., first connection structure, second connection structure) configured to releasably couple the first and second housings together. In the illustrated embodiment, the first and second housings 116, 118 are configured to be directly coupled together. The first and second connection structures 126, 128 are interengageable (e.g., directly engage each other) to releasably couple the first and second housings 116, 118 together. The first connection structure 126 is part of the first housing 116 and the second connection structure 128 is part of the second housing 118.

In the illustrated embodiment, the first connection structure 126 comprises a first hook 130 and the second connection structure 128 comprises a second hook 132. The first and second hooks 130, 132 are configured to interlock (FIG. 6) to releasably couple the first and second housings 116, 118 together. The first hook 130 is integrally formed with the first housing 116 and the second hook 132 is integrally formed with the second housing 118. In order to align (e.g., longitudinally align) the first and second hooks for interlocking engagement, at least one of the first and second housings 116, 118 is rotated relative to the other housing. In other words, the first and second housings 116, 118 are rotated relative to each other to couple and decouple from each other.

In this embodiment, the first and second housings 116, 118 are identical to each other. In the illustrated embodiment, the first and second housings 116, 118 are each an integral, one-piece component. For example, the first and second housings 116, 118 may each be a single piece of molded plastic. In other embodiments, the first and second housings 116, 118 may be formed from two or more pieces coupled or secured together.

The fiber optic connector assembly 110 may include one or more biasing springs 136 (e.g., coil springs). The one or more biasing springs 136 are configured to bias at least one of the first or second ferrules 112, 114 out of their respective first or second housing 116, 118 toward the other respective ferrule when the first and second housings are coupled together. In the illustrated embodiment, the fiber optic connector assembly 110 includes two biasing spring 136 (e.g., a first spring and a second spring). The springs 136 help maintain the optical connection between the first and second ferrules 112, 114. The first spring 136 biases the first ferrule 112 toward the second ferrule 114 when the first and second housings 116, 118 are coupled together. Likewise the second spring 136 biases the second ferrule 114 toward the first ferrule 112 when the first and second housings 116, 118 are coupled together. One end of each spring 136 engages the first or second housing 116, 118 within its cavity and the other end of the spring engages the flange 122 of its corresponding first or second ferrule 112, 114. One spring 136 is received in the cavity of the first housing 116 and the other spring is received in the cavity of the second housing 118.

In this embodiment, the spring 136 is also configured to bias the first and second housings 116, 118 toward a locked position (FIG. 6). The first and second housings 116, 118 are releasably coupled together when the first and second housings are in the locked position. In the locked position, the first and second hooks 130, 132 are interlocked with each other. Accordingly, the springs 136 bias the first and second hooks 130, 132 toward each other. Due to the configuration of the first and second hooks 130, 132, the springs 136 bias the first and second housings 116, 118 away from each other. To disconnect the first and second housings 116, 118, the first and second housings are first pushed together (disengaging the first and second hooks 130, 132 from each other) and then rotated relative to one another to move the first and second hooks out of alignment with each other. To couple the first and second housings 116, 118 together, the first and second housings brought together and then rotated to relative to one another (FIG. 9) to bring the first and second hooks 130, 132 into alignment (e.g., longitudinal alignment) with each other (FIG. 6). The first and second housings 116, 118 are then moved apart, such as by the forces of the biasing springs 136, to interlock the first and second hooks 130, 132. Accordingly, the first and second housings 116, 118 (broadly, at least one of the first and second housings) are configured to rotated (e.g., rotated in a first set of directions) relative to each other to connect the first and second housings to each other and to be rotated (e.g., rotated in a second set of directions, generally opposite the first set of directions) relative to each other to disconnect the first and second housings from each other.

In one embodiment, to form the connection, the first optical fiber F1 is threaded through the opening of the first housing 116, the first spring 136 is threaded onto the first optical fiber and then the first optical fiber is terminated in the first ferrule 112. Similarly, the second optical fiber F2 is threaded through the opening of the second housing 118, the second spring 136 is threaded onto the second optical fiber and then the second optical fiber is terminated in the second ferrule 114. One of the first and second ferrules 112, 114 can then be threaded into the insert 120. The first and second ferrules 112, 114 are then inserted into the alignment sleeve 124 and then moved back into the insert 120. After, the first and second housings 116, 118 are moved over the insert 120 and coupled together as described above, securing the optical connection. The insert 120 facilitates the longitudinal alignment of the first and second housings 116, 118 and the first and second housings can each slide over and rotate about the insert.

Figure 10:
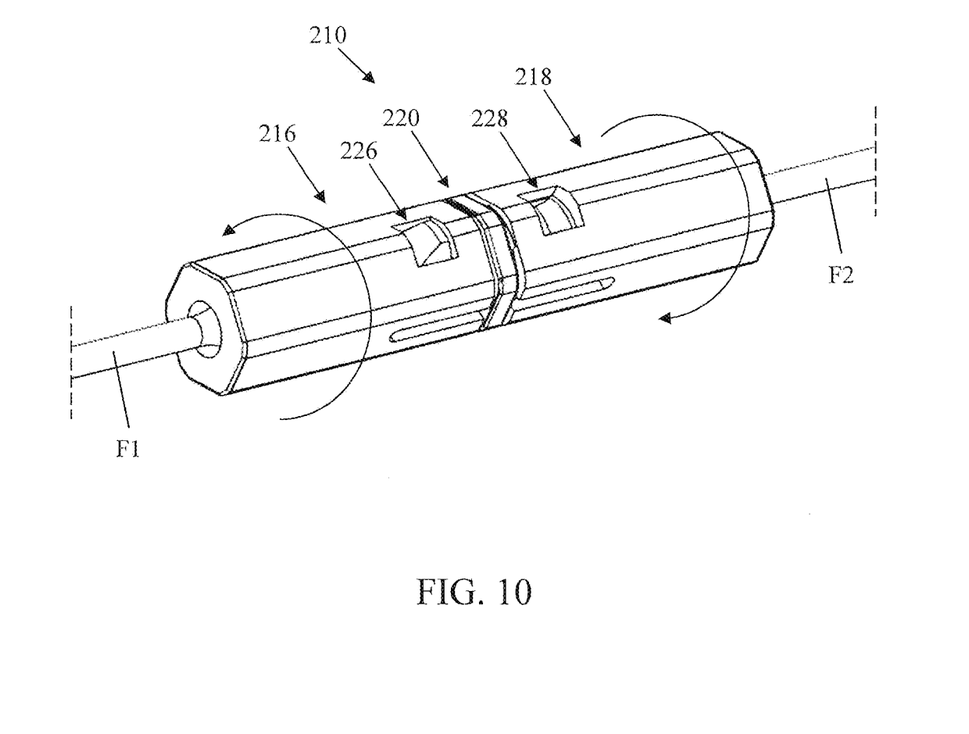
FIG. 10 is a perspective of a micro connector assembly according to another embodiment of the present disclosure.

Referring to FIGS. 10-16, a fiber optic connector assembly or micro connector assembly according to another embodiment of the present disclosure is generally indicated at reference numeral 210. The fiber optic connector assembly 210, or more particularly a collection of its component parts, may be referred to as a "kit." The fiber optic connector assembly 210 includes first and second ferrules 212, 214, and first and second micro connector ferrule housings 216, 218 (a "first housing" and a "second housing"). The first ferrule 212 is configured to be connected to a first optical fiber F1. The second ferrule 214 is configured to be connected to a second optical fiber F2. The first and second ferrules 212, 214 each define an internal passage 215 (FIG. 16) for receiving the first and second optical fibers F1, F2, respectively. The fiber optic connector assembly 210 is used to form a fiber optic connection. When the fiber optic connector assembly 210 is assembled together, as shown in FIG. 10, an optical connection is formed between the first and second ferrules 212, 214 that enables communication therebetween in an optical communications network (e.g., the first and second optical fibers F1, F2). Other configurations of the fiber optic connector assembly 210 are within the scope of the present disclosure. For example, the connector assembly could make electrical or other types of connections instead of or in addition to an optical connection.

Figure 11:
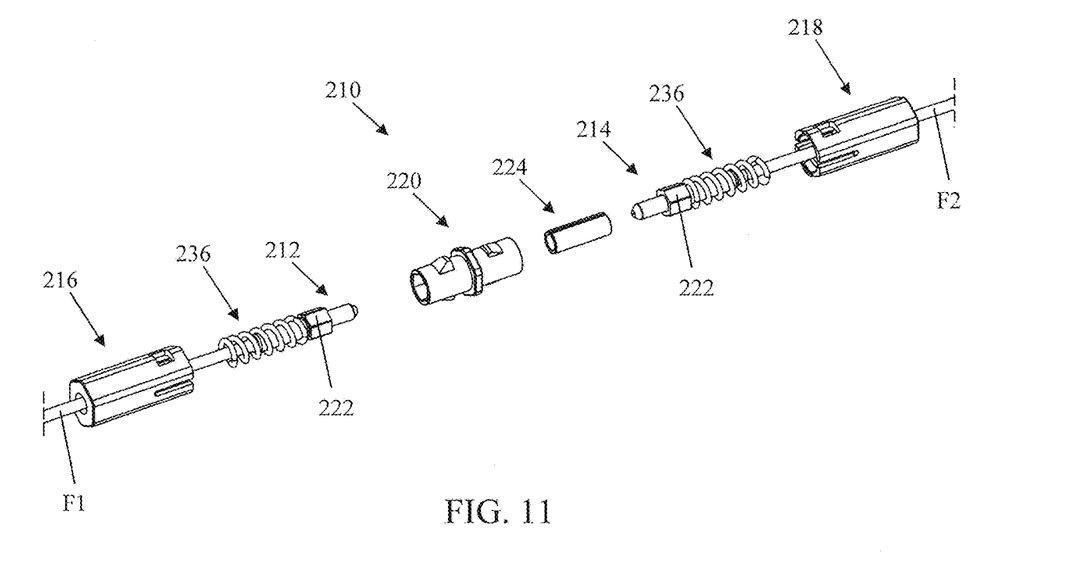
FIG. 11 is an exploded perspective of the micro connector assembly of FIG. 10.

The first and second housings 216, 218 each define a cavity sized and shaped to receive at least one of the first and second ferrules 212, 214. The first and second ferrules 212, 214 are disposed in a closely spaced relation with the first and second housings 216, 218 when in each cavity. Preferably, each cavity has a height and a width such that it can only receive only one ferrule 212, 214 in heightwise and widthwise directions (e.g., can't receive two ferrules in a side-by-side arrangement but may still be long enough to receive two ferrules in an end-to-end arrangement). The first and second housings 216, 218 are generally cylindrical in shape. The first and second housings 216, 218 each have fiber optic openings (e.g., in an end thereof) sized and shaped to correspond to the shape of the first and second optical fibers F1, F2, respectively, to permit the first and second optical fibers to pass through the respective first and second housings and into each respective cavity.

Figure 12:
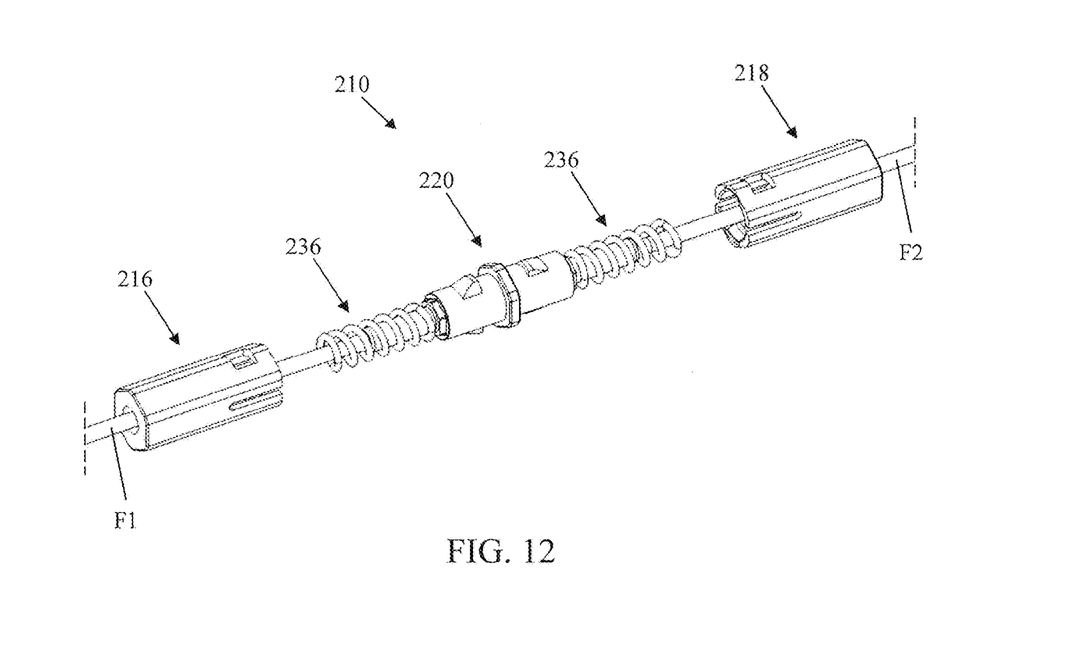
FIG. 12 is a partially exploded perspective of the micro connector assembly of FIG. 10.
Figure 13:
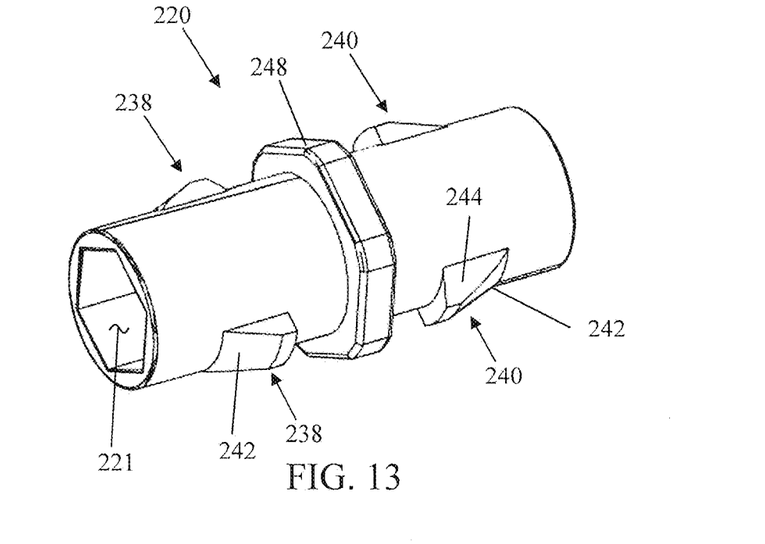
FIG. 13 is a perspective of an insert of the micro connector assembly of FIG. 10.

In this embodiment, the fiber optic connector assembly 210 includes an insert 220. The insert 220 is configured to be disposed in each cavity of the first and second housings 216, 218 when the first and second housings are coupled together. In other words, the cavity of the first housing 216 is sized in shaped to receive a portion of the insert 220 and the cavity of the second housing 218 is sized and shaped to receive another portion of the insert. The insert 120 can slide into and out of the first and second housings 216, 218 (e.g., open ends thereof). Thus, the insert 220 is configured to be disposed within the first and second housings 216, 218 when the first and second housings are coupled together.

Figure 14:
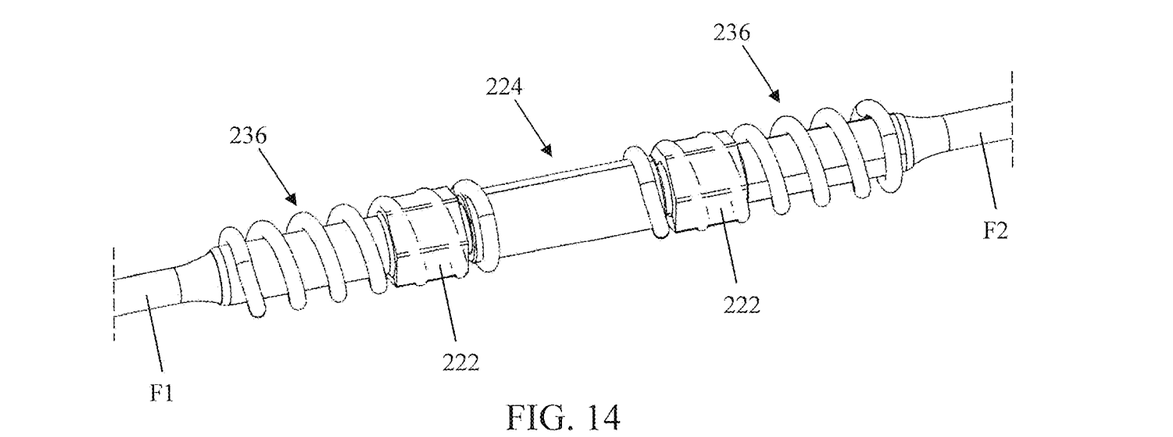
FIG. 14 is a perspective of ferrules and alignment sleeve of the micro connector assembly of FIG. 10 forming an optical connection.
Figure 15:
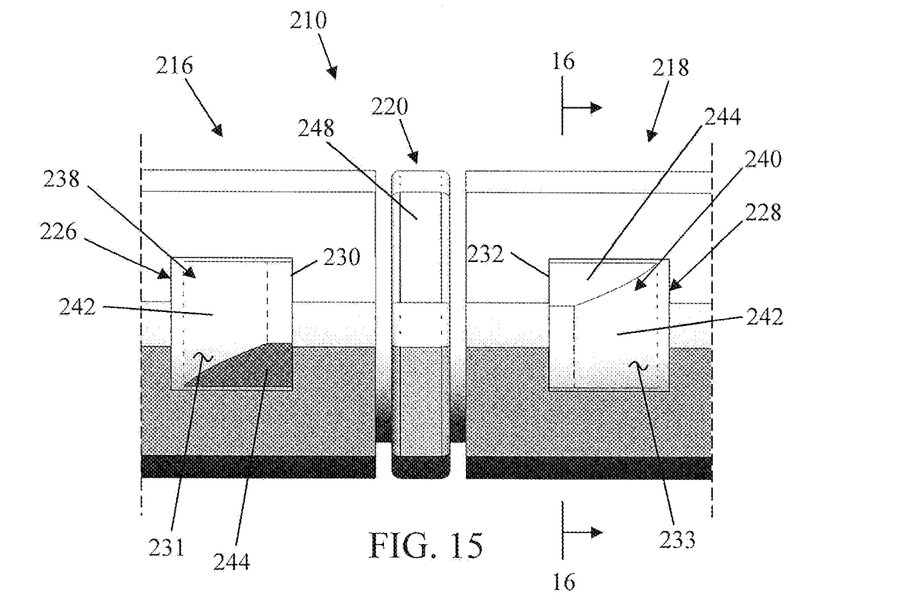
FIG. 15 is an enlarged, fragmentary, top plan view of the micro connector assembly of FIG. 10.

In this embodiment, the insert 220 is configured to engage the first and second ferrules 212, 214 to prevent the first and second ferrules from rotating relative to each other. The insert 220 defines a ferrule cavity 221 of sized and shaped to receive portions of the first and second ferrules 212, 214. The first and second ferrules 212, 214 each include a flange 222 having a polygonal (e.g., hexagonal) cross-section (e.g., cross-sectional shape). The ferrule cavity 221 defined by the insert 220 has a polygonal (e.g., hexagonal) cross-section that matches the polygonal cross-sections of the flanges 222. Thus, rotation of the first and second ferrules 212, 214 relative to each other is inhibited by the insert 220 when the flanges 222 of the first and second ferrules are disposed within the ferrule cavity of the insert.

To assist the ferrules 212, 214 in making the optical connection when the first and second housings 216, 218 are coupled together, the fiber optic connector assembly 210 may include an alignment sleeve 224. The alignment sleeve 224 is configured to receive the mating end portions (e.g., tips) of the first and second ferrules 212, 214. The alignment sleeve 224 aligns the first and second ferrules 212, 214 with each other. The alignment sleeve 224 is sized and shaped to be received in the ferrule cavity 221 of the insert 220. In other words, the alignment sleeve 224 is disposed in the insert 220.

The first and second housings 216, 218 are configured to be releasably coupled (e.g., directly or indirectly coupled) together such that the first and second ferrules 212, 214, form an optical connection when the first and second housings are coupled together. The first and second housings 216, 218 each have at least one connection structure 226, 228 (e.g., at least one first connection structure, at least one second connection structure) configured to releasably couple the first and second housings together. In the illustrated embodiment, the first and second housings 216, 218 are configured to be indirectly coupled together. Specifically, the first and second housings 216, 218 are configured to be coupled together via the insert 220. The first and second connection structures 226, 228 engage the insert 220 to releasably couple the first and second housings 216, 218 together. The at least one first connection structure 226 is formed as part of the first housing 216 and the at least one second connection structure 228 is formed as part of the second housing 218. In the illustrated embodiment, the first housing 216 includes two first connection structures 226 and the second housing 218 includes two second connection structures 228. Each first connection structure 226 comprises a first recess or opening 231 bounded in part by a first shoulder or face 230 and each second connection structure 228 comprises a second recess or opening 233 bounded in part by a second shoulder or face 232.

In the illustrated embodiment, the insert 220 includes at least one first detent 238 and at least one second detent 240. In the illustrated embodiment, the insert 220 includes two first detents 238 and two second detents 240. Each first detent 238 corresponds to one of the first connections structures 226 and each second detent 240 corresponds to one of the second connection structure 228. Each first detent 238 is configured to engage one of the first connection structures 226 and each second detent 240 is configured to engage one of the second connection structures 228 to releasably coupled the first housing 216, the second housing 218 and the insert 220 together. Specifically, each first detent 238 is configured to be received in the first opening 231 of the corresponding first connection structure 226 and engage the first face 230 (broadly, the first housing 216). Likewise, each second detent 240 is configured to be received in the second opening 233 of the corresponding second connection structure 228 and engage the second face 232 (broadly, the second housing 218).

Each detent 238, 240 includes a first or longitudinal deflection ramp 242 and a second or lateral deflection ramp 244. The first and second deflection ramps 242, 244 extend generally perpendicular relative to each other. The first deflection ramp 242 is configured to facilitate the connection of the first or second housing 216, 218 to the insert 220. The first deflection ramp 242 of each detent 238, 240 is arranged to deflect the corresponding first or second housing 216, 218 (e.g., a portion thereof) as said first or second housing is connected to the insert 220. The first and second housings 216, 218 are configured to move along a longitudinal axis of the insert 220 to connect to the insert. Specifically, the first and second housings 216, 218 are connected to the insert 220 by longitudinally sliding each housing over the insert. As the first and second housings 216, 218 slide along the insert 220, the housings engage the first deflection ramps 242, which resiliently deflect the housings to permit the housings to move along and over the detents 238, 240. Once the first or second opening 231, 233 of each housing 216, 218 becomes aligned with the corresponding detent 238, 240, each housing returns or snaps-back to its undeformed or undeflected state thereby securing each housing to the insert 220 (e.g., a snap-fit connection is formed). In this configuration, each detent 238, 240 faces and engages the corresponding first or second face 230, 232 to inhibit disconnection of each housing 216, 218 with the insert 220. Each first and second housing 216, 218 may include one or more relief slots 246 (FIG. 16) to facilitate the portion of each of the first and second housings being resiliently deflected by the ramps 242 of the detents 238, 240. In the illustrated embodiment, the insert 220 includes a circumferential flange 248 extending around the circumference of the insert. The circumferential flange 248 acts as a stop to prevent over insertion of the first and second housings 216, 218 on the insert 220.

Figure 16:
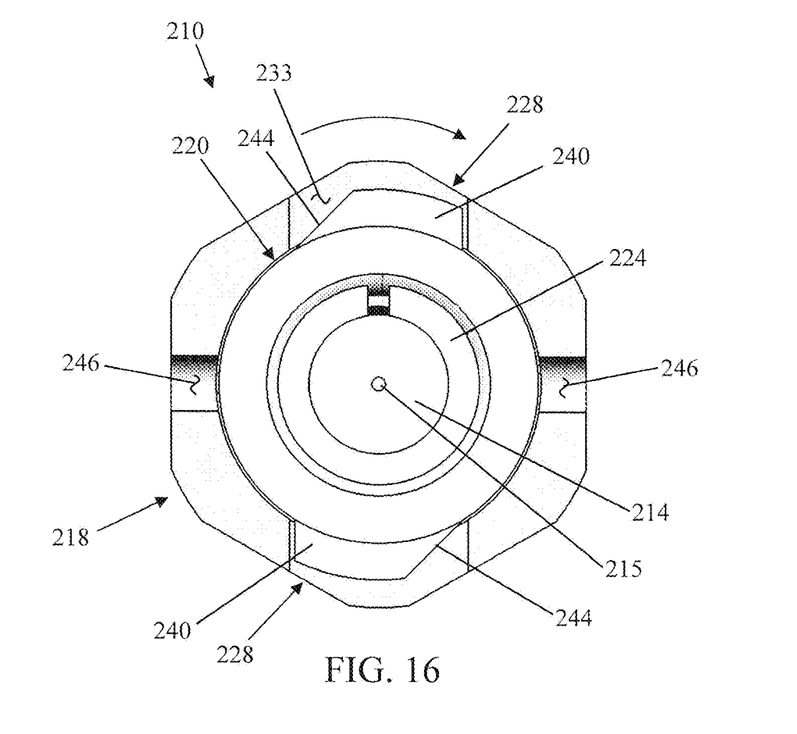
FIG. 16 is a cross-sectional view of the micro connector assembly of FIG. 10 taken through line 16-16 of FIG. 15.

The second deflection ramp 244 is configured to facilitate the disconnection of the first or second housing 216, 218 from the insert 220. The second deflection ramp 244 of each detent 238, 240 is arranged to deflect the corresponding first or second housing 216, 218 (e.g., the portion thereof) as said first or second housing is disconnected from the insert 220. The first and second housings 216, 218 are configured to rotate (FIG. 10) about the longitudinal axis of the insert 220 to disconnect from the insert. Specifically, the first and second housings 216, 218 are disconnected to the insert 220 by rotating each housing over the insert (FIG. 16). As the first and second housings 216, 218 are rotate about the insert 220, the housings engage the second deflection ramps 244, which resiliently deflects the housings to permit the housings to move along and over the detents 238, 240. This permits the first and second faces 230, 232 to clear their corresponding detent 238, 240 and allows the first and second housings 216, 218 to be longitudinally slid along the insert to disconnect from the insert. Thus, the first and second housings 216, 218 are rotated relative to the insert 220 (and each other) to and decouple from each other. Accordingly, the first and second housings 216, 218 are configured to rotated relative to each other (and the insert 220) to disconnect the first and second housings from each other.

In this embodiment, the first and second housings 216, 218 are identical to each other. In the illustrated embodiment, the first and second housings 216, 218 are each an integral, one-piece component. For example, the first and second housings 216, 218 may each be a single piece of molded plastic. In other embodiments, the first and second housings 216, 218 may be formed from two or more pieces coupled or secured together.

The fiber optic connector assembly 210 may include one or more biasing springs 236 (e.g., coil springs). The one or more biasing springs 236 are configured to bias at least one of the first or second ferrules 212, 214 toward the other respective ferrule when the first and second housings 216, 218 are coupled together. In the illustrated embodiment, the fiber optic connector assembly 210 includes two biasing spring 236 (e.g., a first spring and a second spring). The springs 236 help maintain the optical connection between the first and second ferrules 212, 214. The first spring 236 biases the first ferrule 212 out of the first housing 216 toward the second ferrule 214 when the first and second housings 216, 218 are coupled together. Likewise, the second spring 236 biases the second ferrule 214 out of the second housing 218 toward the first ferrule 212 when the first and second housings 216, 218 are coupled together. One end of each spring 236 engages the corresponding first or second housing 216, 218 within the cavity, and the other end of the spring engages the flange 222 of its corresponding first or second ferrule 212, 214. One spring 236 is received in the cavity of the first housing 216 and the other spring is received in the cavity of the second housing 218.

In this embodiment, the spring 236 is also configured to bias the first and second housings 216, 218 toward a locked position (FIG. 10). The first and second housings 216, 218 are releasably coupled together when the first and second housings are in the locked position. The springs 236 bias the first and second housings 216, 218 away from each other. Accordingly, in the locked position, the first detents 238 engage and are biased against the first faces 230 and the second detents 240 engage and are biased against the second faces 232.

In one embodiment, to form the connection, the first optical fiber F1 is threaded through the opening of the first housing 216, the first spring 236 is threaded onto the first optical fiber and then the first optical fiber is terminated in the first ferrule 212. Similarly, the second optical fiber F2 is threaded through the opening of the second housing 218, the second spring 236 is threaded onto the second optical fiber and then the second optical fiber is terminated in the second ferrule 214. One of the first and second ferrules 212, 214 can then be threaded into the insert 220. The first and second ferrules 212, 214 are then inserted into the alignment sleeve 224 and then moved back into the insert 220. Subsequently, the first and second housings 216, 218 are moved longitudinally over the insert 220 and coupled together as described above, securing the optical connection. The insert 220 facilitates the longitudinal alignment of the first and second housings 216, 218 and the first and second housings can each slide over and rotate about the insert.

In one embodiment, the micro connection assembly 10, 110, 210 may come as a kit that includes the first and second ferrules 12, 12', 14, 14', 112, 114, 212, 214, the first and second housings 16, 18, 116, 118, 216, 216, the insert 120, 220, the alignment sleeve 24, 24', 124, 224 and/or the spring(s) 36, 136, 216. Other kit configurations are within the scope of the present disclosure.

Modifications and variations of the disclosed embodiments are possible without departing from the scope of the invention defined in the appended claims. For example, where specific dimensions are given, it will be understood that they are exemplary only and other dimensions are possible.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A micro connector kit comprising:
   a first ferrule configured to be connected to a first optical fiber, the first ferrule having a first flange;
   a second ferrule configured to be connected to a second optical fiber, the second ferrule having a second flange;
   first and second micro connector ferrule housings each defining a cavity, the first and second micro connector ferrule housings being configured to be releasably coupled together such that the first and second ferrules form an optical connection when the first and second micro connector ferrule housings are coupled together; and
   the first and second micro connector ferrule housings having first and second connection structure formed integrally with the first and second micro connector ferrule housings, respectively, the first and second connection structure being configured to releasably couple the first and second micro connector ferrule housings together;
   wherein the second micro connector ferrule housing includes an insert portion and the cavity of the first micro connector housing is sized and shaped to receive the insert portion, the insert portion configured to receive the first and second flanges within the insert portion when the first and second micro connector ferrule housings are coupled together.

2. The micro connector kit of claim 1, wherein the first and second ferrules each define an internal passage for receiving an optical fiber.

3. The micro connector kit of claim 2, wherein the first connection structure comprises a recess and the second connection structure comprises a protrusion sized and shaped to be received in the recess.

4. The micro connector kit of claim 3, wherein the first micro connector ferrule housing includes a channel extending from the recess, the channel sized and shaped to permit the protrusion to move within the channel.

5. The micro connector kit of claim 4, wherein the channel is arcuate such that the second micro connector ferrule housing rotates relative to the first micro connector ferrule housing as the protrusion is moved within the channel.

6. The micro connector kit of claim 1, further comprising an alignment sleeve configured to receive mating end portions of the first and second ferrules, and wherein the first connection structure is part of the first micro connector ferrule housing and the second connection structure is part of the second micro connector ferrule housing.

7. The micro connector kit of claim 1, wherein the first and second flanges have a polygonal cross-section, the insert portion comprising a ferrule cavity having a polygonal cross-section matching the polygonal cross-sections of the flanges such that rotation of the first and second ferrules relative to each other is inhibited by the insert portion when the flanges of the first and second ferrules are disposed within the ferrule cavity.

8. The micro connector kit of claim 7, further comprising an alignment sleeve disposed in the insert portion.

9. The micro connector kit of claim 8, wherein the first micro connector ferrule housing and the insert portion respectively include first and second detents configured to releasably couple the first micro connector ferrule housing and the second micro connector ferrule housing together.

10. The micro connector kit of claim 1, further comprising one or more biasing springs configured to bias at least one of the first or second ferrules toward the other respective ferrule when the first and second micro connector ferrule housings are releasably coupled together.

* * * * *